(12) United States Patent
Burton et al.

(10) Patent No.: US 10,169,747 B2
(45) Date of Patent: Jan. 1, 2019

(54) ADVANCED FUNCTION USAGE DETECTION

(71) Applicant: International Business Machines Corporation, Armonk, NY (US)

(72) Inventors: Helena C. Burton, Longmont, CO (US); Brian D. Clark, Tucson, AZ (US); Juan A. Coronado, Tucson, AZ (US); Beth A. Peterson, Tucson, AZ (US); Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 15/216,612

(22) Filed: Jul. 21, 2016

(65) Prior Publication Data
US 2016/0328691 A1 Nov. 10, 2016

Related U.S. Application Data

(63) Continuation-in-part of application No. 12/834,708, filed on Jul. 12, 2010.

(51) Int. Cl.
*G06Q 20/12* (2012.01)
*G06Q 20/14* (2012.01)
*G06Q 30/04* (2012.01)

(52) U.S. Cl.
CPC ......... *G06Q 20/145* (2013.01); *G06Q 20/123* (2013.01); *G06Q 30/04* (2013.01)

(58) Field of Classification Search
CPC ..... G06Q 20/145; G06Q 20/123; G06Q 30/04
See application file for complete search history.

(56) References Cited

U.S. PATENT DOCUMENTS

| | | |
|---|---|---|
| 8,108,640 B1 | 1/2012 | Holl, II |
| 2003/0158869 A1 | 8/2003 | Micka |
| 2006/0277384 A1 | 12/2006 | Yagawa et al. |
| 2007/0078984 A1 | 4/2007 | Abei |
| 2007/0168707 A1 | 7/2007 | Kern et al. |
| 2008/0126734 A1 | 5/2008 | Murase |
| 2008/0228644 A1 | 9/2008 | Birkestrand et al. |
| 2009/0216978 A1 | 8/2009 | Fujibayashi |
| 2010/0138311 A1 | 6/2010 | Pieraldi et al. |
| 2012/0011328 A1 | 1/2012 | Burton et al. |
| 2012/0011514 A1 | 1/2012 | Burton et al. |

*Primary Examiner* — Ramsey Refai
(74) *Attorney, Agent, or Firm* — Kunzler, PC

(57) ABSTRACT

For advanced function usage-based billing, a processor detects the storage controller associating a microcode version for a given advanced function of one or more advanced functions with a logical volume. A given customer is associated with the logical volume. In response to detecting the storage controller associating the microcode version for the given advanced function with the logical volume, the processor monitors for use of a memory address of the microcode version and a logical volume address of the logical volume. The processor further detects an associated use of the memory address of the microcode version and the logical volume address of the logical volume. In response to detecting the associated use, the processor communicates the given advanced function and the given customer to a billing entity.

20 Claims, 18 Drawing Sheets

250 

| 251 | Memory Address 255 | Microcode Identifier 260 |
|---|---|---|
| 251 | Memory Address 255 | Microcode Identifier 260 |
| 251 | Memory Address 255 | Microcode Identifier 260 |
| 251 | Memory Address 255 | Microcode Identifier 260 |

FIG. 16

270 

| 253 | Logical Volume ID 275 | Customer Identifier 280 | Logical Volume Address 285 |
|---|---|---|---|
| 253 | Logical Volume ID 275 | Customer Identifier 280 | Logical Volume Address 285 |
| 253 | Logical Volume ID 275 | Customer Identifier 280 | Logical Volume Address 285 |
| 253 | Logical Volume ID 275 | Customer Identifier 280 | Logical Volume Address 285 |

| Logical Volume ID 275 | Microcode Identifier 260 |
|---|---|
| Logical Volume ID 275 | Microcode Identifier 260 |
| Logical Volume ID 275 | Microcode Identifier 260 |
| Logical Volume ID 275 | Microcode Identifier 260 |

254 labels each row.

FIG. 18

ADVANCED FUNCTION USAGE DETECTION

CROSS-REFERENCE TO RELATED APPLICATIONS

This is a continuation-in-part of and claims priority to U.S. patent application Ser. No. 12/834,708 entitled "ADVANCED FUNCTION USAGE-BASED BILLING" and filed on Jul. 12, 2010 for Helena C. Burton, which is incorporated herein by reference.

FIELD

The subject matter disclosed herein relates to advanced functions on a storage controller and more particularly relates to advanced function usage-based billing.

BACKGROUND

Description of the Related Art

Certain storage controllers offer advanced functionality that allows a user to perform tasks beyond standard data storage. Specifically, these advanced functions, often separately licensed to the user, may include advanced copy features, data replication, and the like.

BRIEF SUMMARY

An apparatus is disclosed for advanced function usage-based billing. The apparatus includes a host in communication with the storage controller through a storage area network. The host includes a processor and a non-transitory computer readable storage medium storing code executed by the processor. The processor detects the storage controller associating a microcode version for a given advanced function of one or more advanced functions with a logical volume. A given customer is associated with the logical volume. In response to detecting the storage controller associating the microcode version for the given advanced function with the logical volume, the processor monitors for use of a memory address of the microcode version and a logical volume address of the logical volume. The processor further detects an associated use of the memory address of the microcode version and the logical volume address of the logical volume. In response to detecting the associated use, the processor communicates the given advanced function and the given customer to a billing entity. A method and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 16 is a schematic block diagram illustrating one embodiment of microcode data;

FIG. 17 is a schematic block diagram illustrating one embodiment of logical volume data;

FIG. 18 is a schematic block diagram illustrating one embodiment of association data.

DETAILED DESCRIPTION

Figure 1:
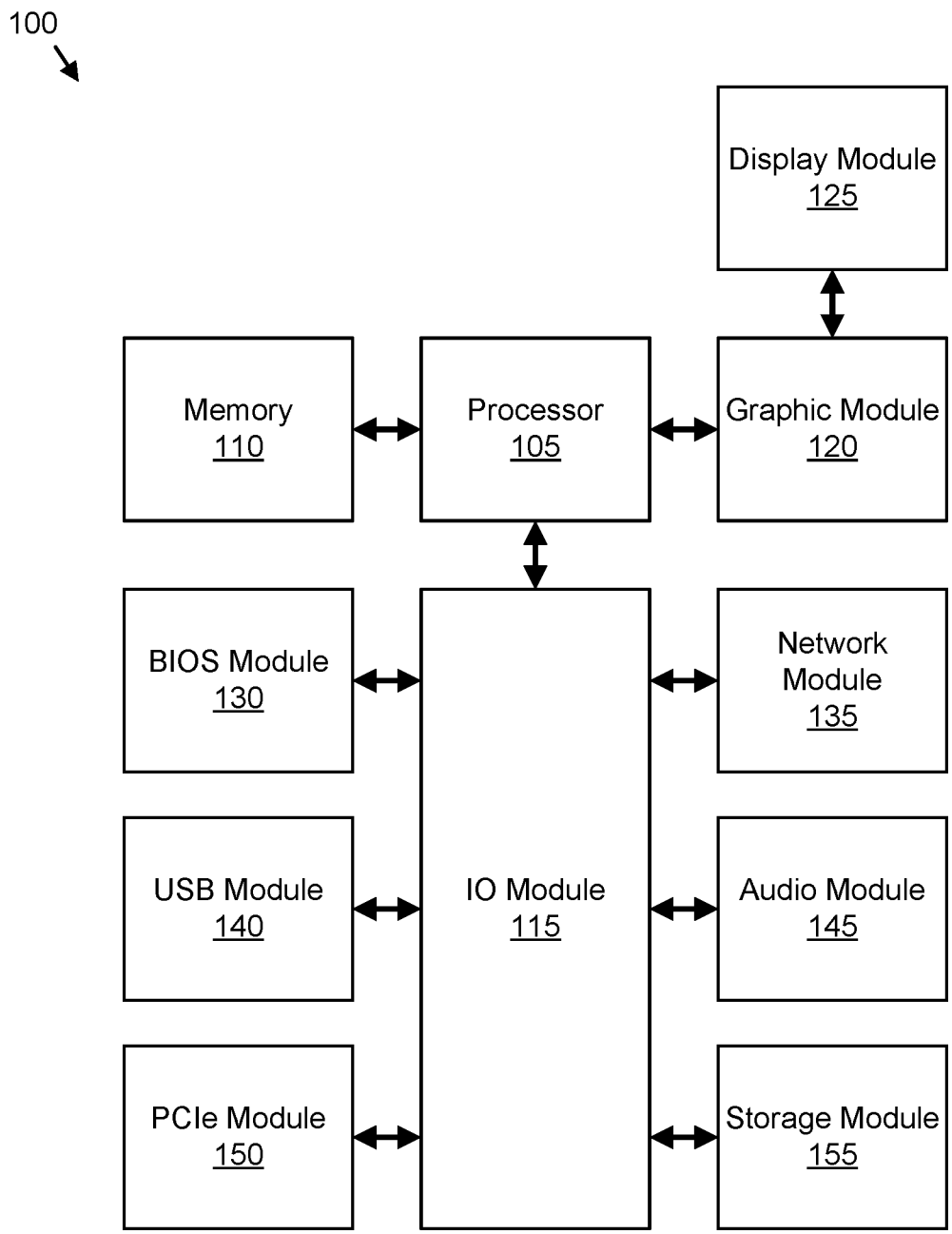
FIG. 1 is a schematic block diagram illustrating one embodiment of a computing device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a computing device 100. The computing device 100 includes a processor 105, a memory 110, an IO module 115, a graphic module 120, a display module 125, a basic input/output system (BIOS) module 130, a network module 135, a universal serial bus (USB) module 140, an audio module 145, a peripheral component interconnect express (PCIe) module 150, and a storage module 155. One of skill in the art will recognize that other configurations of a computing device 100 or multiple computer systems 100 may be employed with the embodiments described herein.

The processor 105, memory 110, IO module 115, graphic module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device (SSD). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

The display module 125 may communicate with the graphic module 120 to display information as will be described hereafter. The display module 125 may be a cathode ray tube (CRT), a liquid crystal display (LCD) monitor, or the like.

The processor 105 may also communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computing device 100, so that computer readable software instructions stored on the storage module 155 can load, execute, and assume control of the computing device 100. Alternatively, the BIOS module 130 may comprise a coded program embedded on a chipset that recognizes and controls various devices that make up the computing device 100.

The network module 135 may communicate with the IO module 115 to allow the computing device 100 to communicate with other devices over a network. The devices may include routers, bridges, computers, printers, and the like.

The USB module 140 may communicate with one or more USB compatible devices over a USB bus. The audio module 145 may generate an audio output.

In one embodiment, each module comprises a computer readable storage medium comprising a computer readable program stored on a tangible storage device.

Figure 2:
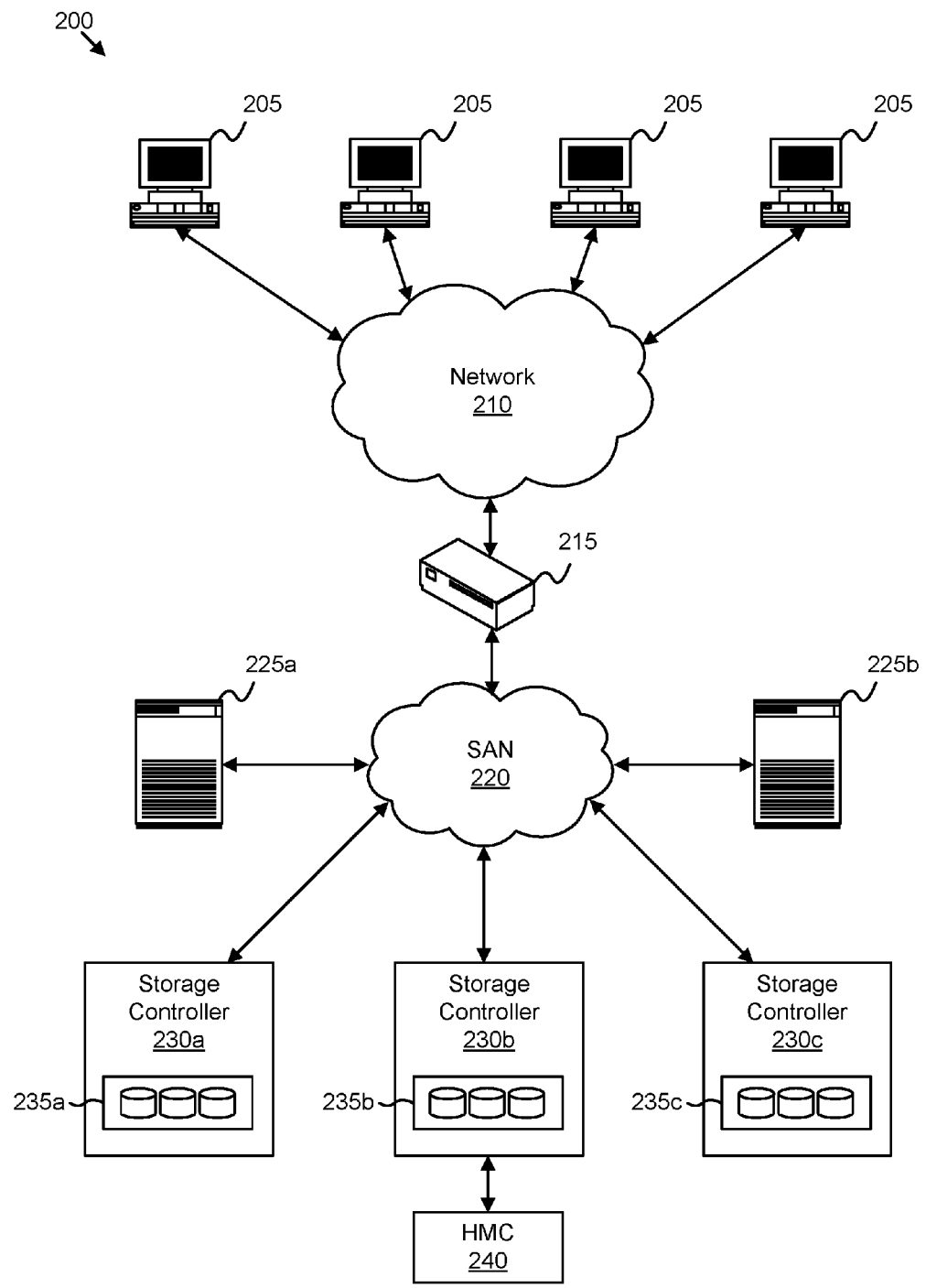
FIG. 2 is a schematic block diagram illustrating one embodiment of a system with advanced function capability.

FIG. 2 illustrates one embodiment of a system 200 with advanced function capability. The system 200 includes multiple clients 205, a network 210, a gateway 215, multiple hosts 225, a storage area network ("SAN") 220, multiple storage controllers 230 with embedded storage 235, and a Hardware Management Console ("HMC"). Each client 205 may be embodied as a desktop computer, a server, a handheld computing device, a portable computer, a mainframe computer, and the like. Furthermore, each client 205 may be in communication with the network 210. The network 210 may comprise a global communications network such as the Internet, a Local Area Network (LAN), multiple LANs communicating over the internet, or any other similar communications network.

A gateway 215 may be in communication with the network 210. The gateway 215 may comprise an interface between the network 210 and the SAN 220 as is known in the art. The gateway 215 may include a firewall, router, switch, server, and the like. The gateway 215 may be embodied as software, hardware, or a combination of hardware and software.

The SAN 220 may comprise a communication sub-network to facilitate communication between the hosts 225 and the storage controllers 230. As is known in the art, a SAN 220 may communicate using network protocols such as Fiber Channel, Internet small computer system interface ("iSCSI"), and the like. In other embodiments, the hosts 225 and the storage controllers 230 may communicate through another communication media such as a LAN, multiple LANs, or other similar network in place of or in addition to the SAN 220.

In the depicted embodiment, the hosts 225 are in communication with the SAN 220. Each host 225 may be computer, a server, a mainframe computer, and the like. In one embodiment, each host 225 is a System z series mainframe computer from International Business Machines ("IBM"). Each host 225 may run applications and/or provide a command prompt to interface with and/or control the storage controllers 230.

The hosts 225 may communicate with the storage controllers 230 through the SAN 220. In one embodiment, a single host 225a may communicate with a single storage controller 230a or multiple storage controllers 230a-c and multiple hosts 225a,b may communicate with a single storage controller 230a or multiple storage controllers 230a-c. As described above, each storage controller 230 may interface with applications and/or commands from one or more hosts 225. Additionally, a storage controller 230 may also interface with and/or receive commands from an HMC 240—a computer coupled to or integrated with the storage controller 230b that allows a user to manage the storage controller 230b.

The storage controllers 230 control, manage, and/or facilitate data storage to coupled storage devices. The storage controllers 230 may be enterprise-level storage controllers 230 with embedded storage 235 such as DS8000 series storage controllers from IBM. While the storage controllers 230 in the depicted embodiment includes embedded storage 235 with storage devices integrated into the storage controller 230, the system 200 may include storage controllers 230 coupled to external storage devices. Furthermore, each storage controller 230 may be embodied as hardware, software, or a combination of hardware and software.

Additionally, while the system 200 depicts hosts 225 and storage controllers 230 as separate network entities, the system 200 may also include a host 225, storage controller 230, and storage devices residing in a single entity.

The storage controllers 230 may perform a set of standard functions. As used herein, standard functions of a standard function set comprise operations of a storage controller 230 related to basic data transfer and maintenance such as reading data, writing data, storage space recovery (garbage collection), and the like. Standard functions may be non-fee based functions and/or functions that are part of a basic data package from a server provider/vendor with a set cost for a predetermined amount storage space, bandwidth, and the like.

In addition to standard functions, the storage controllers 230 may also perform advanced functions. As used herein, advanced functions comprise optional storage controller operations (storage controller enhancements) including fee-based operations separate from standard functions including but not limited to Flashcopy, Space Efficient ("SE") Flashcopy, Metro Mirror, Global Mirror, Metro Global Mirror, Thin Provisioned Volumes, Parallel Access Volumes ("PAV"), Hyper Parallel Access Volumes, and Remote Mirror for System z ("RMZ"). A user may license advanced functions under an additional license agreement from a server provider. Furthermore, in one embodiment, advanced functions include storage controller functions whose specific operations, characteristics, and/or procedures are not monitored and/or recorded by conventional storage controllers 230 as described in greater detail below. Advanced functions may involve data security, data duplication, and performance enhancements. For example, advanced functions such as Metro Mirror and Global Mirror allow a data to be replicated, creating a mirror copy even over long distances. FlashCopy creates a "point-in-time" copy on a target volume for immediate use. In one embodiment, standard functions are separate from advanced functions.

A user may assign or associate a logical volume or portion of a logical volume (an extent) of a storage device with an advanced function. Data stored on the assigned volume may then be used with the associated advanced function. Advanced functions may be controlled by an application running on the host 225, command line or script execution at the host 225, and/or from the HMC 240 along with other similar methods of control. Licensing for advanced functions is described in greater detail below.

Each of the clients 225, gateway 215, hosts 225, and storage controllers 230 may include all or a portion of the components and modules described in relation to the computing device 100 of FIG. 1 including processors 105, memory 110, and the like.

Figure 3:
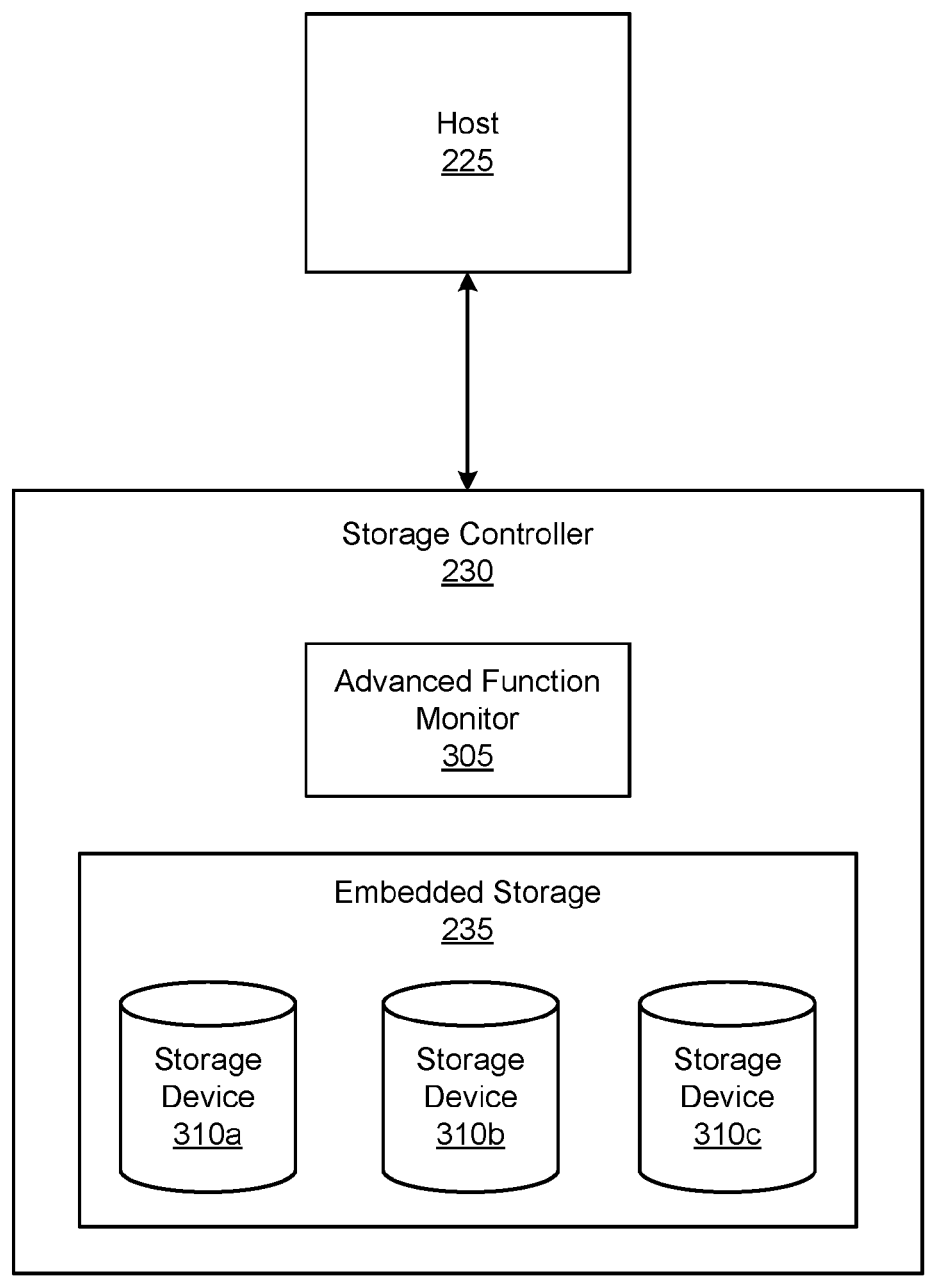
FIG. 3 is a schematic block diagram illustrating one embodiment of a system with a host computer/server in communication with a storage controller that includes an advanced function monitor.

FIG. 3 illustrates one embodiment of a system 300 with a host 225 in communication with a storage controller 230. The storage controller 230 includes an advanced function monitor 305 and embedded storage 235 with a plurality of storage devices 310. The description of the system 300 refers to elements of FIG. 2, like numbers referring to like elements. Those of skill in the art recognize that the system 300 may be simpler or more complex than illustrated, so long as the system 300 includes modules or sub-systems that correspond to those described herein.

The host 225 may be substantially similar to one or more of the hosts 225 depicted in FIG. 2. The host 225 may be in communication with the storage controller 230 through a SAN 220 or other connection as described in FIG. 2. Similarly, the storage 230 controller with embedded storage 235 may also be substantially similar to one or more of the storage controllers 230 with embedded storage 235 depicted in FIG. 2. In the depicted embodiment, the embedded storage 235 includes a plurality of storage devices 310. Each storage device 310 may include a hard disk drive, an optical storage device, a holographic storage device, a micromechanical storage device, a solid-state storage drive, and the like.

The advanced function monitor 305 on the storage controller 230 facilitates managing, monitoring, planning, and/or billing advanced functions used on the storage controller 230. In conventional storage controllers with conventional advanced function license agreements, a user licenses an advanced function using a tiered system of advanced function capacity. Specifically, a user may purchase specific tier of advanced function capacity that defines an amount of storage controller storage the advanced function will utilize. For example, a user, in purchasing a tier for FlashCopy, may choose from tier one, giving two terabytes of storage, and tier two, giving four terabytes of storage.

Therefore, a user must anticipate which advanced functions and how much of each advanced function to use. If the user under-plans, the user will not have the advanced function capacity to perform desired advance functions. If the user over-plans, the user has paid for unused advanced function capacity. Moreover, conventional storage controllers, while typically monitoring standard functions, do not monitor advanced function usage—a license is based on a "high-water" advanced function capacity mark. Thus, a user has no way to tell how much advanced function capacity has been used, how much remains, or advanced function usage over time.

Additionally, since workloads change over time, what may have been a well planned advanced function capacity may later become too small or even too large for a user's current needs. Furthermore, the capacity range between tiers can be quite large. Therefore, a user's operational needs may lie just beyond one tier such that the user needs to purchase a license for the next larger tier, thereby paying for unused capacity.

Therefore, in one embodiment, the advanced function monitor 305 initializes monitoring routines, detects advanced function use, and monitors the detected advanced functions. The advanced function monitor 305 may identify advanced functions on the storage controller 230 including available advanced functions. As used herein, available advanced functions comprise advanced functions that the storage controller 230 is capable of executing, whether licensed or unlicensed. Available advanced functions include selected advanced functions and unselected advanced functions. Selected advanced functions are user-licensed advanced functions having a pre-existing license for a user to use the selected advanced function on the storage controller 230. Conversely, unselected advanced functions lack a pre-existing license. The advanced function monitor 305 may monitor an amount of storage used by each advanced function, including the amount of storage used over time. Furthermore, the advanced function monitor 305 may monitor other characteristics of the advanced functions such as logical volumes used in the advanced functions, logical addresses used in the advanced functions, the identity of applications that call the advanced functions, and the like. Additionally, the advanced function monitor 305 may allow a user to customize the advanced function monitoring using monitor parameters.

In one embodiment, the advanced function monitor 305 enables a user to manage advanced function planning. The advanced function monitor 305 may record information on use of advanced functions over a predetermined time period and generate a planning report based on the recorded information. The planning report may include average use, minimum use, maximum use, use at a specific instant in time, and the like. Furthermore, the advanced function monitor 305 may also allow a user to customize the planning report using report parameters. Therefore, a user may see which advanced functions are used, how much advanced function capacity each advanced function uses, and the like to facilitate better planning and licensing of advanced functions.

In one embodiment, the advanced function monitor 305 also facilitates usage-based billing of advanced functions. Specifically, the advanced function monitor 305 may determine and/or record information about each use of advanced functions for billing purposes. The advanced function monitor 305 may also communicate with a billing entity such as a server provider and transmit this billing information to the billing entity. Therefore, a server provider may bill a user based on what advanced functions the user actually used. Moreover, instead of basing licensing on an amount of storage used for the advanced function, licensing may be determined by other characteristics of the advanced function use.

The advanced function monitor 305 may reside on the storage controller 230 as depicted. A user may interface with the advanced function monitor 305 through command line execution and/or application on the host 225 or HMC 240 and the like. While the depicted embodiment shows the advanced function monitor 305 residing in the storage controller 230, portions of the advanced function monitor 305, in other embodiments, may reside on the host 225, HMC 240, client 205, and/or other device in communication with the storage controller 230.

Advanced Function Monitoring

Figure 4:
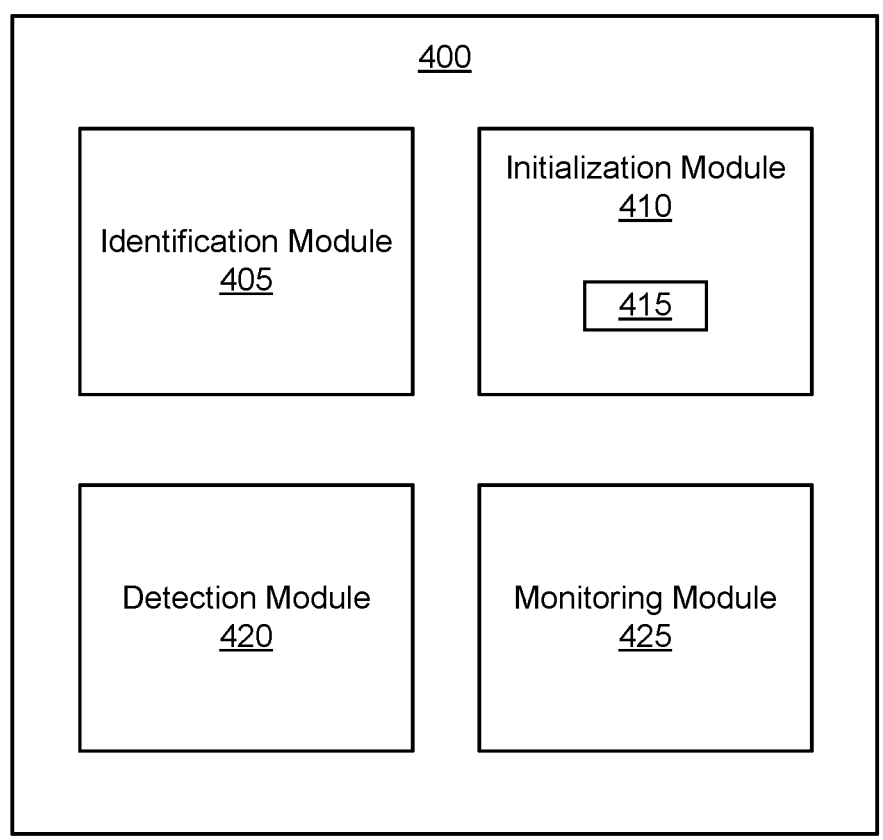
FIG. 4 is a schematic block diagram illustrating one embodiment of an apparatus for advanced function monitoring on a storage controller.

FIG. 4 illustrates one embodiment of an apparatus 400 for advanced function monitoring on a storage controller 230. The apparatus 400 may be one embodiment or portion of the advanced function monitor 305 depicted in FIG. 3. The description of the apparatus 400 refers to elements of FIGS. 1-3, like numbers referring to like elements. The apparatus 400 includes an identification module 405, an initialization module 410, a detection module 420, and a monitoring module 425.

The identification module 405 identifies one or more advanced functions for a storage controller 230. In one embodiment, the identification module 405 identifies a plurality of distinct advanced functions. For example, the identification module 405 may identify FlashCopy and MetroMirror on the storage controller. The identification module 405 may identify available advanced functions and selected advanced functions as described above. The available advanced functions may be advanced functions that the microcode on the storage controller 230 is capable of executing regardless of whether the advanced functions are licensed by a user and/or currently assigned to a logical volume on the storage devices 310 controlled by the storage controller 230. In one embodiment, the identification module 405 identifies available advanced functions based on the version of the microcode running on the storage controller 230. In one embodiment, the identification module 405 identifies advanced functions licensed by a user and/or currently assigned to a logical volume on the storage devices 310 controlled by the storage controller 230 as selected advanced functions.

The initialization module 410 initializes a monitoring routine 415 to monitor a particular advanced function of the identified advanced functions. Initializing the monitoring routine 415 may include configuring, creating, and/or initiating the monitoring routine 415. The monitoring routine 415 may include one or more monitor parameters. Examples of monitor parameters include parameters that define predetermined time intervals for monitoring, monitoring frequency, alert thresholds, characteristics and/or events of the advanced functions to monitor, and what characteristics and/or events to record/log. Each monitor parameter may be a user-defined monitor parameter or a default monitor parameter. For example, a user may define a monitor parameter relating to the length of time to monitor. Specifically, the user may set the associated monitor parameter to monitor the advanced function FlashCopy for 30 days. Continuing the example, if the user fails to define this monitor parameter, a default monitor parameter of 60 days may be used.

Defined by the monitor parameters, the monitoring routine 415 may specify when to monitor, what to monitor, and how to monitor advanced functions. The monitoring routine 415 may specify alert thresholds to alert a user when advanced function capacity reaches a certain percentage of licensed capacity. Furthermore, an alert threshold may also specify alerting the user if the user attempts to use an unlicensed advanced function.

The initialization module 410 may initialize a single monitoring routine 415, or several monitoring routines 415 for any number of advanced functions. For example, each advanced function may have a separate monitoring routine 415 with varying monitor parameters. In one embodiment, the initialization module 410 initializes a monitoring routine 415 for selected advanced functions and a separate monitoring routine for unselected advanced functions.

The detection module 420 detects use of advanced functions. The detection module 420 may have the capability to detect use of a plurality of distinct advanced functions. For example, the detection module 405 may detect use of FlashCopy, MetroMirror, and the like on the storage controller. The detection module 420 may be initiated by a signal from the initialization module 410 as the initialization module 410 finalizes a monitoring routine 415. In one embodiment, the detection module 420 detects use of a particular advanced function in response to the storage controller 230 accessing at least a portion of a logical volume (such as one or more extents) associated with and/or assigned to the particular advanced function. The detection module 420 may also detect use of the particular advanced function in response to the storage controller 230 changing an association of at least a portion of a logical volume with the particular advanced function. For example, a user may assign an advanced function to a particular logical volume and the storage controller 230 may associate the particular logical volume with the advanced function.

The monitoring module 425 monitors use of advanced functions on the storage controller 230. Monitoring use of an advanced function may include analyzing, recording, and/or sensing use of the advanced functions. Furthermore, use of an advanced function may occur when the advanced function is executed, performed, and/or operated on the storage controller 230. In one embodiment, the monitoring module 425 begins monitoring an advanced function in response to the detection module 420 detecting use of the advanced function.

In one embodiment, the monitoring module 425 monitors use of an advanced function according to the monitoring routine 415 defined by its one or more monitor parameters as described above. The monitoring module 425 may monitor available advanced functions on the storage controller 230 including selected advanced functions and unselected advanced functions. For example, if a user attempts to use an unselected (unlicensed) advanced function, assuming the storage controller 230 is configured to allow such use, such as, for an additional fee, the monitoring module 425 may monitor the unselected advanced function.

In one embodiment, the monitoring module 425 monitors an amount of storage used for the particular advanced function and/or characteristics of an advanced function including relationships, extents, logical volumes, and/or logical addresses involved with the advanced function. In one embodiment, the monitoring module 425 monitors events related to an advanced function including static events and ongoing events. A static event may be a single event such as a one-time copy of data. Furthermore, an ongoing event may be a continuous event such as a synchronous or an asynchronous remote copy where an advanced function continually duplicates data as updates to the data occur.

Furthermore, the monitoring module 425 may monitor specific events and characteristics that are particular to an advanced function. Table 1 describes one embodiment of potential characteristics for monitoring corresponding to various advanced functions:

TABLE 1

| | |
|---|---|
| FlashCopy | Number of defined device pairs involved with copy, type of defined relationship (e.g. one device is source, other device is destination), amount of capacity used by defined pairs, and number and range of defined extents (portions of logical volume involved in copy). |
| Space Efficient ("SE") FlashCopy | Similar to as FlashCopy plus size of SE track pool and actual usage of SE track pool. |
| Metro Mirror | Similar to SE FlashCopy except number and range of defined extents. |
| Global Mirror | Similar to Metro Mirror |
| Metro Global Mirror | Similar to Metro Mirror |
| Thin Provisioned Volumes | Number of actual volumes defined, capacity of actual volumes, and actual capacity use of volumes. |
| Parallel Access Volumes ("PAV") | Number and logical address of PAV base volumes (one base volume with a relationship with one or more alias volumes) defined, number and logical address of PAV alias volumes defined for each logical volume. |
| Hyper Parallel Volumes | Same as PAV, plus number and logical address of volumes defined in alias pool. |
| Remote Mirror for System z ("RMZ") | Number and type of defined relationships, number of tracksets transferred, size of sidefile pool, number of defined sessions. |

The characteristics listed in Table 1 are a non-limiting example of potential characteristics monitored for the specified advanced functions. Furthermore, many other characteristics and combinations of characteristics may be monitored by the monitoring module 425.

The monitoring module 425 may monitor the status of advanced function capacity at a certain point in time, or over a period of time. Furthermore, the monitoring module 425 may log the monitored use information including the events of the advanced functions in a log as described below.

Figure 5:
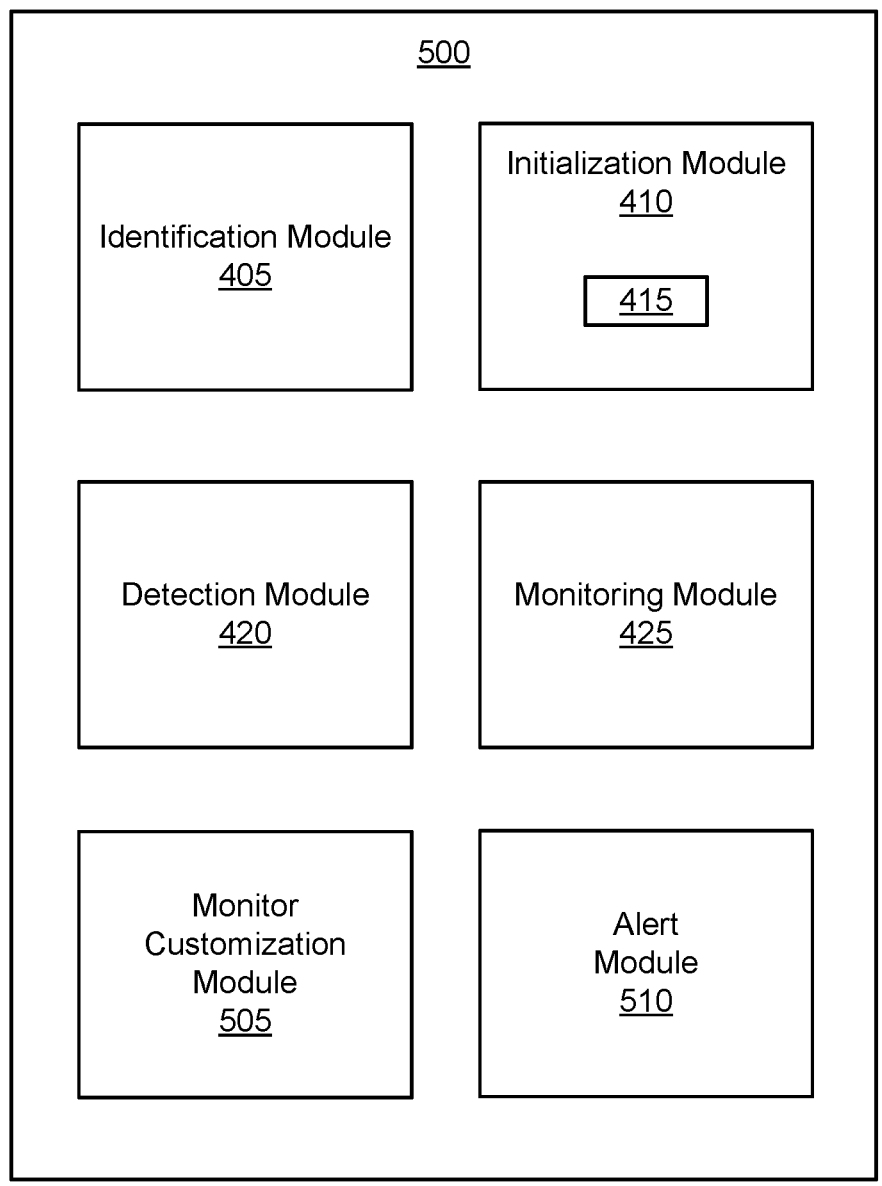
FIG. 5 is a detailed schematic block diagram illustrating another embodiment of an apparatus for advanced function monitoring on a storage controller.

FIG. 5 illustrates another embodiment of an apparatus 500 for advanced function monitoring on a storage controller 230. The apparatus 500 may be another embodiment or portion of the advanced function monitor 305 depicted in FIG. 3. The description of the apparatus 500 refers to elements of FIGS. 1-4, like numbers referring to like elements. The apparatus 500 includes the identification module 405, the initialization module 410, the detection module 420, and the monitoring module 425, wherein these include substantially the same features as described in relation to FIG. 4. In addition, the apparatus 500 further includes a monitor customization module 505 and an alert module 510.

The monitor customization module 505 defines the user-defined monitor parameters based on user input. The monitor customization module 505 may set certain monitor parameters in response to receiving input from the user defining these values. For example, a user may, through an application on the host 225 for example, define time intervals for the monitoring module 425 to monitor FlashCopy. The monitor customization module 505 may set the monitor parameter relating to time intervals to be incorporated into the monitoring routine 415 by the initialization module 410. Thus, the user may customize the monitoring.

The alert module 510 generates alerts based on the monitored use and/or a user attempting to use an advanced function. The alert module 510 may generate an alert in response to the storage controller 230 reaching an alert threshold for the advanced function as described above. The alert module 510 may generate an alert before an advanced function is used, or during use of an advanced function. For example, a user may select a logical volume for a FlashCopy advanced function. The alert module 510 may detect that the amount of storage required for the operation will exceed 90% of the licensed capacity for FlashCopy and in response, the alert module 510 may generate an alert. In addition, during use of an advanced function, if capacity or characteristics reach an alert threshold, the alert module 510 may also alert the user. The user may configure the thresholds for the alert module 510 through the monitor parameters as described above. In one embodiment, the alert module 510 allows the user to continue past the alert and use the advanced function that is subject to the alert such as after a prompt allowing the user to agree to additional fees.

Figure 6:
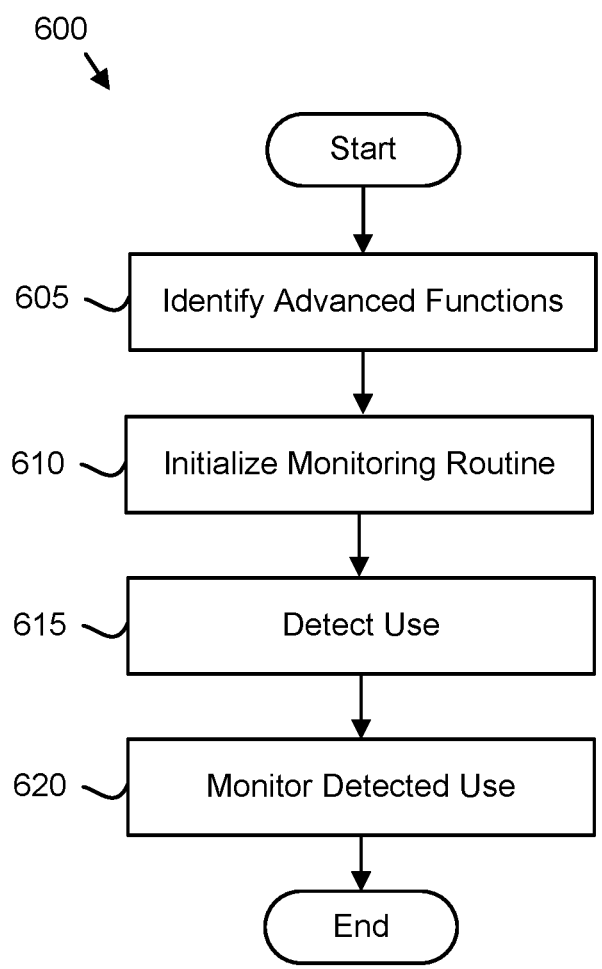
FIG. 6 is a schematic flow chart diagram illustrating one embodiment of a method for advanced function monitoring.

FIG. 6 illustrates one embodiment of a method 600 for advanced function monitoring. The method 600 substantially includes the steps to carry out the functions presented above with respect to the operation of the described apparatus and systems of FIGS. 1-4. The description of the method 600 refers to elements of FIGS. 1-5, like numbers referring to like elements.

The method 600 starts and the identification module 405 identifies 605 one or more advanced functions for a storage controller 230. The initialization module 410 initializes 610 a monitoring routine to monitor a particular advanced function of the one or more identified advanced functions. Next, the detection module 420 detects 615 use of the particular advanced function. The monitoring module 425 then monitors 620 the detected use of the particular advanced function on the storage controller 230 according to the monitoring routine 415 and the method 600 ends.

Figure 7:
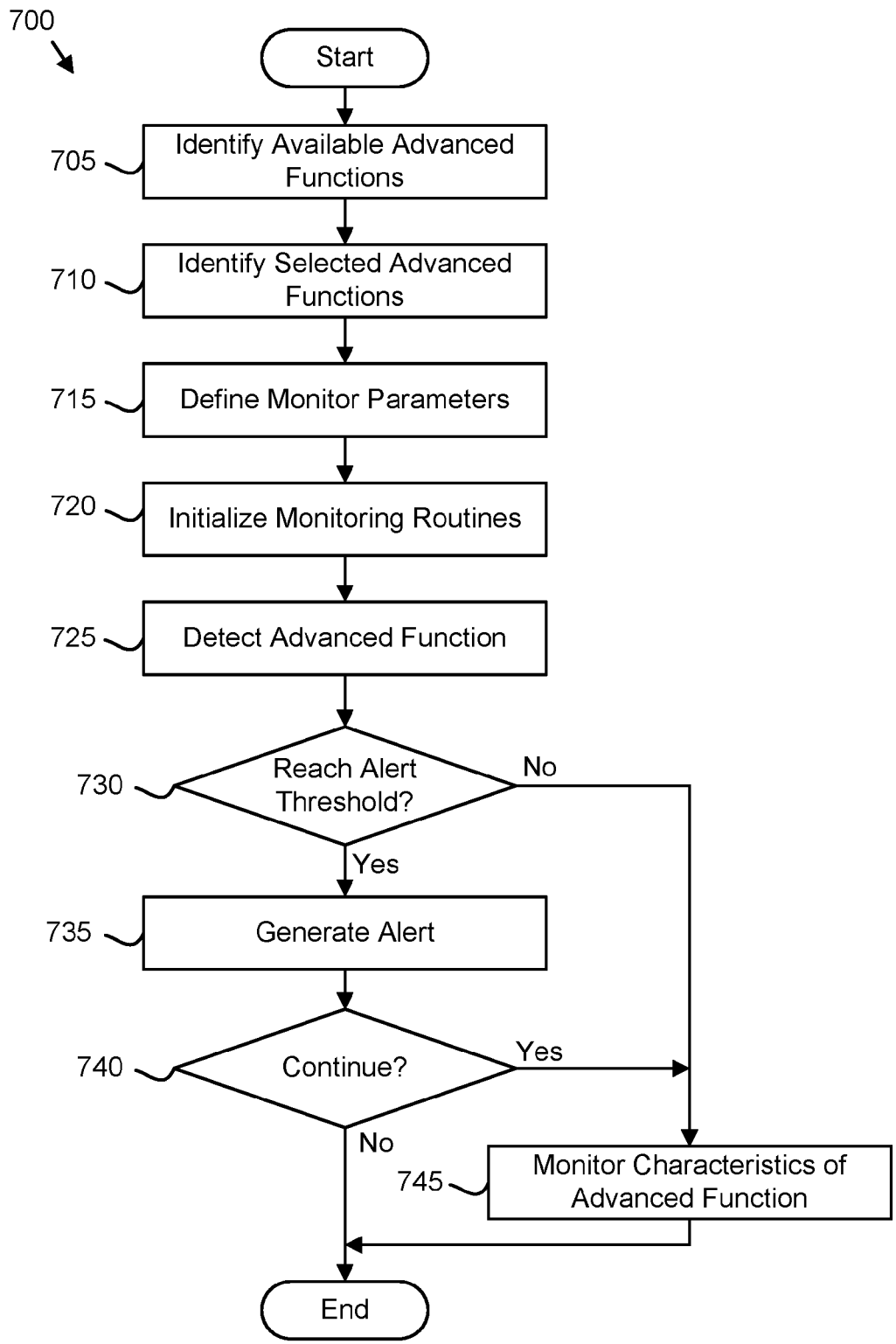
FIG. 7 is a detailed schematic flow chart diagram illustrating another embodiment of a method for advanced function monitoring.

FIG. 7 illustrates another embodiment of a method 700 for advanced function monitoring. The method 700 substantially includes the steps to carry out the functions presented above with respect to the operation of the described apparatus and system of FIGS. 1-5. The description of the method 700 refers to elements of FIGS. 1-5, like numbers referring to like elements.

The method 700 starts and the identification module 405 identifies 705 available advanced functions on a storage controller 230. The available advanced functions may be advanced functions that the microcode on the storage controller 230 is capable of executing. Next, the identification module 405 identifies 710 selected advanced functions on the storage controller 230. The selected advanced functions may be advanced functions licensed by a user. The monitor customization module 505 then defines 715 user-defined monitor parameters based on user input. The monitor parameters that are not defined by a user may be left at default values.

Next, the initialization module 410 initializes 720 monitoring routines 415 to monitor the identified advanced functions. The monitoring routines 415 may include different monitor parameters depending on whether the advanced function is a selected advanced function or an unselected advanced function. The detection module 420 then detects 725 use of a particular advanced function and/or attempted use in response to the storage controller 230 using and/or executing the particular advanced function or a user attempting to associate an advanced function with a logical volume. The alert module 510 determines 730 whether the storage controller 230 has reached an alert threshold for the particular advanced function. If the alert module 510 determines 730 that the storage controller 230 has not reached an alert threshold, the monitoring module 425 then monitors 745 the detected use of the particular advanced function including events/characteristics of the advanced function according to the monitoring routine 415 and the method 700 ends.

Alternatively, the alert module 510 determines 730 that the storage controller 230 has reached an alert threshold and the alert module 510 generates an alert. If the storage controller 230 continues 740 with the particular advanced function, such as in response to the user acknowledging the alert and choosing to continue, the monitoring module 425 then monitors 745 the detected use of the particular advanced function including events/characteristics of the advanced function according to the monitoring routine 415 and the method 700 ends. The storage controller 230 may also not continue 740 with the advanced function, such as if the storage controller 230 is configured to restrict use of unlicensed advanced functions, or restrict use of advanced functions when not enough advanced function capability is available, and the method 700 ends.

Generating an Advanced Function Usage Planning Report

Figure 8:
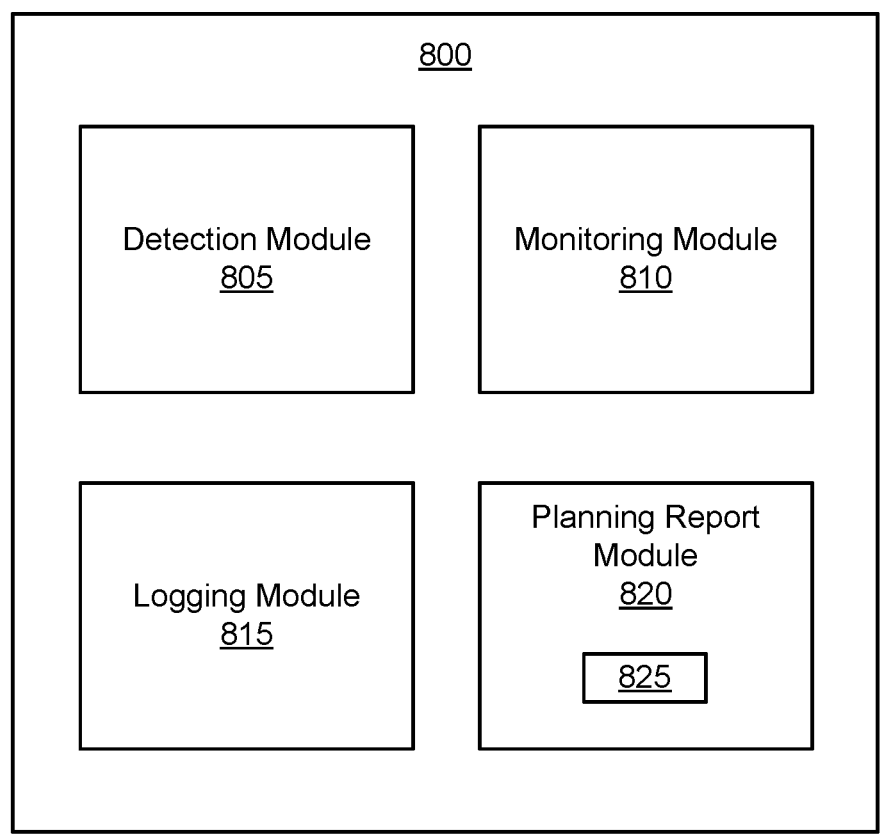
FIG. 8 is a schematic block diagram illustrating one embodiment of an apparatus for generating an advanced function usage planning report.

FIG. 8 illustrates one embodiment of an apparatus 800 for generating an advanced function usage planning report. The apparatus 800 may be one embodiment or portion of the advanced function monitor 305 depicted in FIG. 3. The description of the apparatus 800 refers to elements of FIGS. 1-3, like numbers referring to like elements. The apparatus 800 includes a detection module 805, a monitoring module 810, a logging module 815, and a planning report module 820.

The detection module 805 detects use of an advanced function on the storage controller 230. The detection module 805 may be substantially similar to the detection module 420 described in relation to FIG. 4. As described above, the detection module 805 may detect available advanced functions including selected advanced functions and unselected advanced functions.

The monitoring module 810 monitors the use of the advanced function on the storage controller 230. The monitoring module 810 may also be substantially similar to the monitoring module 425 described above in relation to FIG. 4.

The logging module 815 records use information of the detected use. Use information may include details of advanced function characteristics/events monitored by the monitoring module 810. Use information may include timeline information specifying when certain events occurred, the identity of applications that triggered the advanced function, and the like. Furthermore, use information may also include any other monitored details associated with the advanced functions. The logging module 815 may determine what events and/or characteristics to log based on the monitoring routine 415. For example, the logging module 815 may record default characteristics/events specified by default monitor parameters. Additionally, the logging module 815 may record user-defined characteristics/events specified from user-defined monitor parameters.

The planning report module 820 generates a planning report based at least in part on the use information recorded by the logging module 815 for one or more advanced functions. In one embodiment, the planning report module 820 generates the planning report using recorded use information for a plurality of advanced functions over a predetermined time period. The planning report module 820 may generate a planning report for a specific time period with use information for advanced functions used in that time period. In addition, the planning report module 820 may generate a separate planning report for each advanced function.

In one embodiment, the planning report includes an amount of storage used by each advanced function over the predetermined time period and/or at a moment in time. In some embodiments, the planning report module 820 generates the planning report according to a reporting routine 825 comprising one or more report parameters. Report parameters may specify report content (e.g. the information and format for the report) for use in the planning report. Report parameters may specify that the planning report include average use, minimum use, maximum use, use at a specific instant in time, alert thresholds, report time period, report frequency, report format, and the like. With such use information presented in the planning report, the user may understand the patterns of advanced function use and is better able to approximate how much to spend in licensing for advanced function capacity.

The planning report may include text and graphics (such as a usage graph) and may be embodied in various data formats such as a text file, Hypertext Transfer Markup Language ("HTML"), Extended Markup Language ("XML") and the like.

As with monitor parameters, report parameters may be user-defined or default report parameters. In one embodiment, the reporting routine 825 is a portion of the monitoring routine 415 (referring to FIG. 4) that defines both monitoring and recording of use information. The planning report module 820 may transmit planning reports to the user at a predetermined interval and/or in response to a user query. In addition, the planning report module 820 may store planning reports for access through the host 225 or HMC 240.

Figure 9:
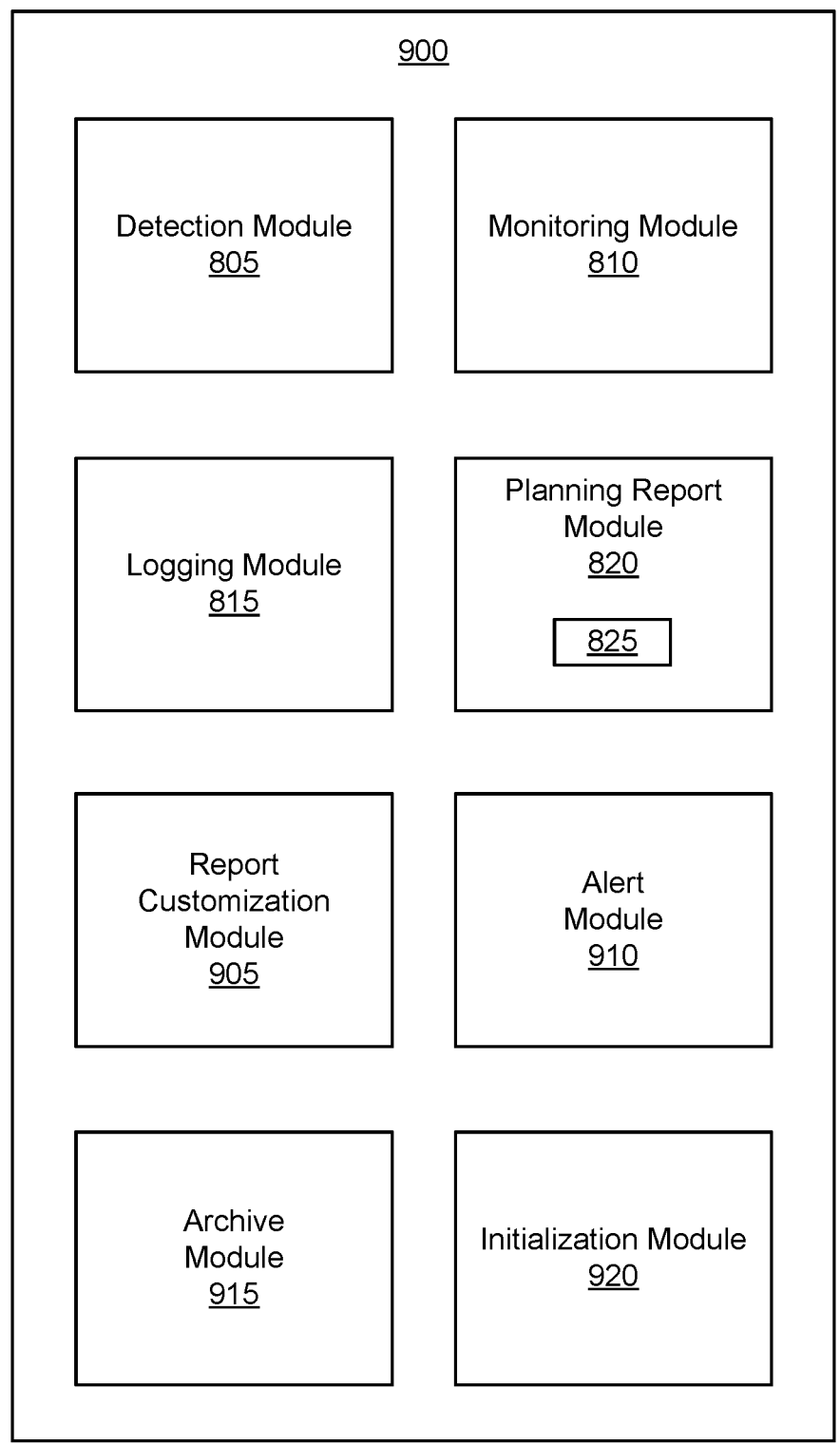
FIG. 9 is a detailed schematic block diagram illustrating another embodiment of an apparatus for generating an advanced function usage planning report.

FIG. 9 illustrates another embodiment of an apparatus 900 for generating an advanced function usage planning report. The apparatus 900 may be another embodiment or portion of the advanced function monitor 305 depicted in FIG. 3. The description of the apparatus 900 refers to elements of FIGS. 1-3 and 8, like numbers referring to like elements. The apparatus 900 includes the detection module 805, the monitoring module 810, the logging module 815, and the planning report module 820, wherein these include substantially the same features as described in relation to FIG. 8. In addition, the apparatus 900 further includes a report customization module 905, an alert module 910, an archive module 915, and an initialization module 920.

The report customization module 905 defines user-defined report parameters based on user input. The report customization module 905 may set certain report parameters in response to receiving input from the user defining these values. For example, a user may, through an application on the host 225 for example, specify what information is recorded by the logging module 815 for FlashCopy. Therefore, as with monitoring, the user may customize the logging.

The alert module 910 may be similar to the alert module 510 described above in relation to FIG. 5. Specifically, the alert module 910 may generate an alert in response to the storage controller 230 reaching an alert threshold for an advanced function.

The archive module 915 archives planning reports. A user may retrieve an archived planning report to view historical advanced function usage. In one embodiment, the archive module 915 stores a predetermined number of archived planning reports specified by reporting parameters. In some embodiments, the archive module 915 archives a planning report in response to a predetermined time interval after the planning report module 820 generates the planning report.

The initialization module 920 initializes a reporting routine 825 with the accompanying report parameters. Initializing the reporting routine 825 may include configuring, creating, and/or initiating the reporting routine. In one embodiment, the initialization module 920 is similar to or embodied as the initialization module 410 described in relation to FIG. 4. In this embodiment, a common initialization module 920, 410 may initialize both the reporting routine and the monitoring routine 415.

Figure 10:
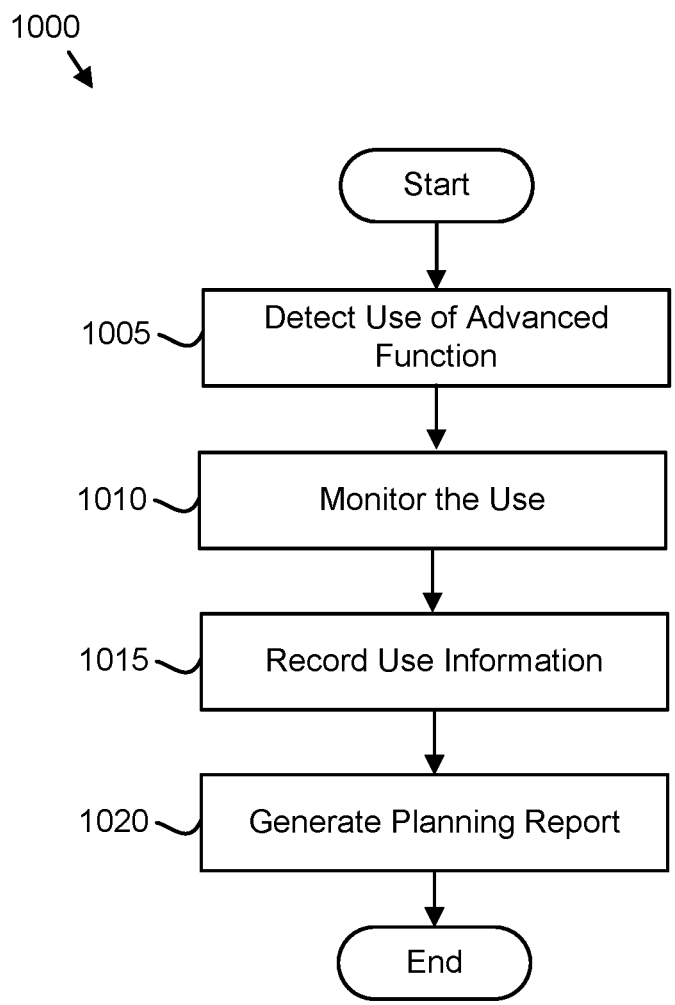
FIG. 10 is a schematic flow chart diagram illustrating one embodiment of a method for generating an advanced function usage planning report.

FIG. 10 illustrates one embodiment of a method 1000 for generating an advanced function usage planning report. The method 1000 substantially includes the steps to carry out the functions presented above with respect to the operation of the described apparatus and systems of FIGS. 1-3 and 8. The description of the method 1000 refers to elements of FIGS. 1-3 and 8, like numbers referring to like elements.

The method 1000 starts and the detection module 805 detects 1005 use of an advanced function on a storage controller 230. The monitoring module 810 then monitors 1010 the use of the advanced function on the storage controller 230. Next, the logging module 815 records 1015 use information of the detected use. The planning report module 820 generates 1020 a planning report based at least in part on the use information for the advanced function. Then, the method 1000 ends.

Figure 11:
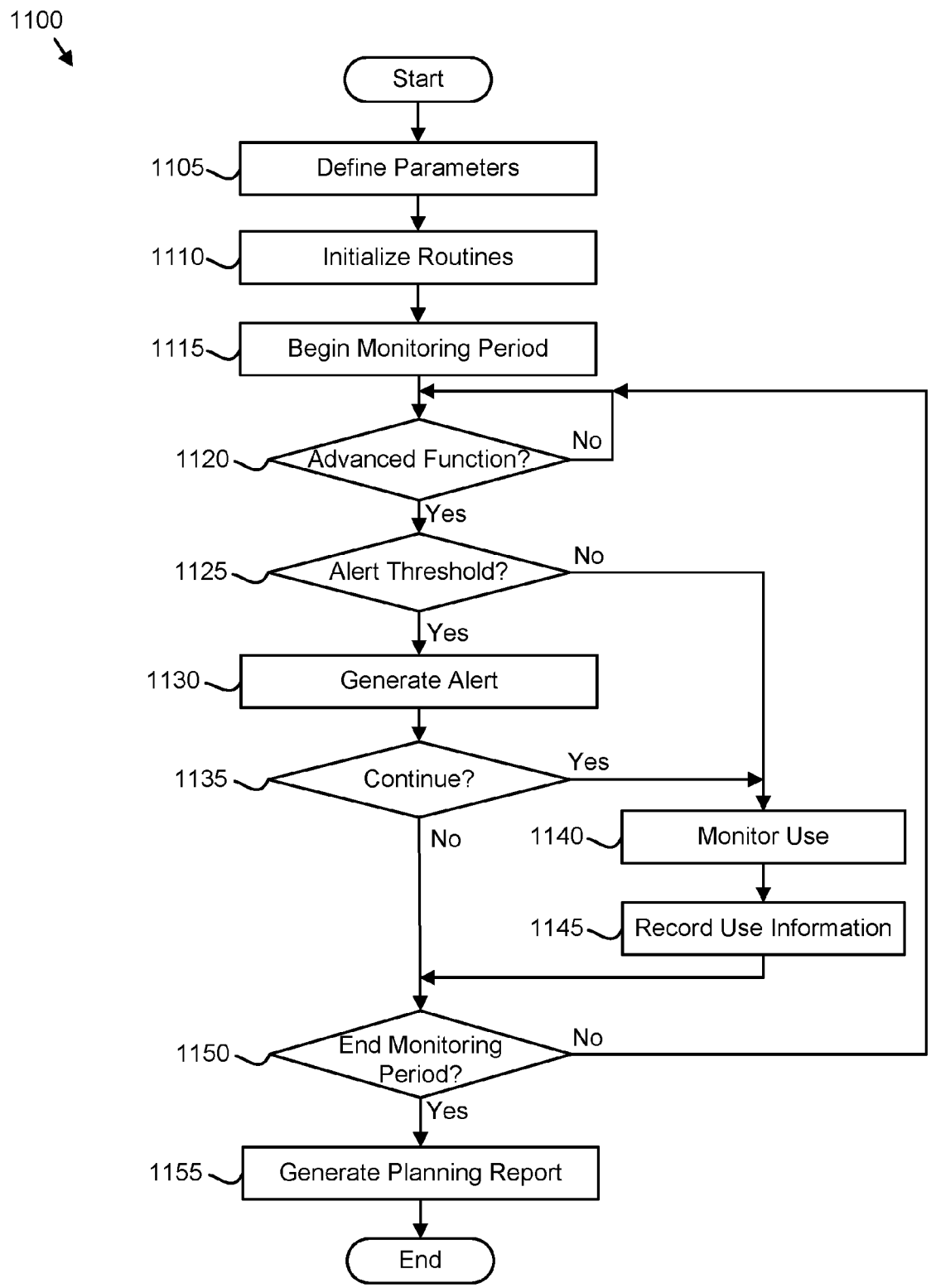
FIG. 11 is a detailed schematic flow chart diagram illustrating another embodiment of a method for generating an advanced function usage planning report.

FIG. 11 illustrates another embodiment of a method 1100 for generating an advanced function usage planning report. The method 1100 substantially includes the steps to carry out the functions presented above with respect to the operation of the described apparatus and system of FIGS. 1-3 and 8-9. The description of the method 1100 refers to elements of FIGS. 1-3 and 8-9, like numbers referring to like elements.

The method 1100 starts and the report customization module 905 defines 1105 one or more user-defined report parameters based on user input. The report customization module 905 may receive the user input from a host 225 or an HMC 240. Next, the initialization module 920 initializes 1110 a reporting routine 925 with the accompanying report parameters. The initialization module 920 may also initialize 1110 a monitoring routine 415 with monitor parameters as described above. The detection module 805 begins 1115 a monitoring period.

If the detection module 805 detects 1120 use of an advanced function, the alert module 910 determines 1125 whether the storage controller 230 has reached an alert threshold for the particular advanced function. If the alert module 910 determines 1125 that the storage controller 230 has not reached an alert threshold, the monitoring module 810 then monitors 1140 the detected use of the particular advanced function including characteristics of the advanced function according to the monitoring routine 415. The logging module 815 records 1145 use information of the detected use. If the detection module 805 determines that the monitoring period 1150 has not ended, the detection module 805 continues to detect 1120 for the use of an advanced function.

Alternatively, if the alert module 910 determines 1125 that the storage controller 230 has reached an alert threshold, the alert module 910 generates an alert. If the storage controller 230 continues 1135 with the particular advanced function, such as in response to a user acknowledging the alert and choosing to continue, the monitoring module 810 then monitors 1140 the detected use of the particular advanced function and the logging module 815 records 1145 use information of the detected use as described above. The storage controller 230 may also not continue 1135 with the advanced function and the method 1100 ends.

Steps 1125-1145 may repeat throughout the monitoring period as the detection module 805 continues detecting 1120 the use of advanced functions. When the detection module 805 determines 1150 that the monitoring period ends, the planning report module 820 generates 1155 a planning report based on the use information for the advanced functions detected and monitored during the monitoring period. Then, the method 1100 ends.

Advanced Function Usage-Based Billing

Figure 12:
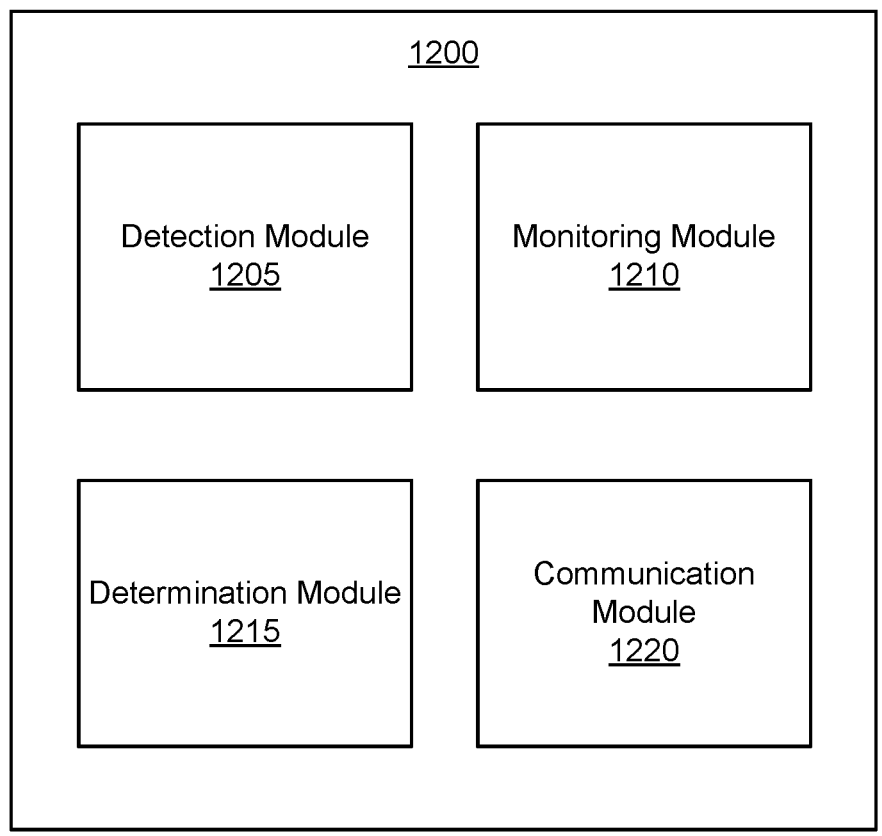
FIG. 12 is a schematic block diagram illustrating one embodiment of an apparatus for advanced function usage-based billing.

FIG. 12 illustrates one embodiment of an apparatus 1200 for advanced function usage-based billing. The apparatus 1200 may be one embodiment or portion of the advanced function monitor 305 depicted in FIG. 3. The description of the apparatus 1200 refers to elements of FIGS. 1-3, like numbers referring to like elements. The apparatus 1200 includes a detection module 1205, a monitoring module 1210, a determination module 1215, and a communication module 1220.

The detection module 1205 detects use of one or more advanced functions on a storage controller 230. The detection module 1205 may be substantially similar to the detection module 420 described in relation to FIG. 4 and the detection module 805 described in relation to FIG. 8. As described above, the detection module 1205 may detect available advanced functions including selected advanced functions and unselected advanced functions.

The monitoring module 1210 monitors the detected use of each advanced function on the storage controller 230. The monitoring module 1210 may also be substantially similar to the monitoring module 425 described above in relation to FIG. 4 and the monitoring module 810 described above in relation to FIG. 8. In certain embodiments, the monitoring routine 415 of the monitoring module 1210 may be focused on monitoring billing related events/characteristics of advanced functions. For example, if billing is based on an amount of storage controller storage used for an advanced function, the monitoring routine 415 may specify that the monitoring module monitor the amount of storage controller storage. Monitor parameters may be defined by a server provider/billing entity and/or a user based on a user's license agreement.

The determination module 1215 determines billable use information of detected use for one or more advanced functions over a predetermined time period. Determining billable use information may include locating, recording, and/or logging use information of an advanced function related to licensing. Billable use information may be similar or identical to use information described above. However, billable use information may specifically involve monitored information of events/characteristics affecting and/or associated with a licensing fee to the user. For example, if a user is billed based on an amount of storage controller storage used for advanced functions, the billable use information may include the amount of storage controller storage used for a predetermined time interval. In one embodiment, the determination module 1215 determines billable use information according to the monitoring routine 415 as described above. In this embodiment, the monitor parameters that specify what events/characteristics to determine and/or record may be defined by a server provider, vendor, or billing entity. In certain embodiments, the determination module 1215 associates cost information with billing usage information as described below.

The communication module 1220 communicates the billable use information to a billing entity. The billing entity may include an organization such as a server provider, vendor, or other similar licensor of advanced functions. The billing entity may also include a server, computer, or other electronic receiving means associated with a server provider or vendor. The communication module 1220 may also communicate the billable use information to a user.

In one embodiment, the communication module 1220 communicates the billable use information electronically through email, a web interface, and the like. In one embodiment, the communication module 1220 electronically transmits the billable use information using an existing service and error reporting infrastructure included in the storage controller 230 to a centralized server or server provider/billing entity. The communication module 1220 may communicate the billable use information periodically, such as at a predetermined interval. The communication module 1220 may also communicate the billable use information substantially concurrently with the determination module 1215 determining the billable use information. Therefore, the server provider/billing entity may receive "real-time" billable use information. The communication module 1220 may also communicate the billable use information in response to a query from the server provider/billing entity. In one embodiment, the communication module 1220 communicates a usage-based billing report from the billable use information as described below.

The billable use information is based on the advanced functions that the user actually used. Therefore, instead of licensing advanced functions to a user with the tier system requiring a user to approximate future usage, the communication module 1220 provides both a user and a billing entity with a more accurate representation of actual use. In addition, the monitoring module 1210, the determination module 1215, and the communication module 1220 provides a billing entity and a user with other billing options. For example, a user may wish to elect a "bill-as-you-go" licensing plan in which the user does not pre-license certain advanced functions and restricted from using others, but is billed for those actually used. In certain embodiments, the storage controller 230 may allow a user to use an unselected advanced function, but the billable use information would show the use of the unselected advanced function and the user would incur an extra charge.

In addition, by including multiple advanced function events/characteristics in the monitoring, logging, and billing information, a billing entity may base a licensing fee on any number of combinations of events/characteristics instead of focusing on an amount of storage controller storage used by an advanced function. For example, in one embodiment, the licensing fee for FlashCopy may be based on a number of defined device pairs involved with copy, or the number of copies.

Figure 13:
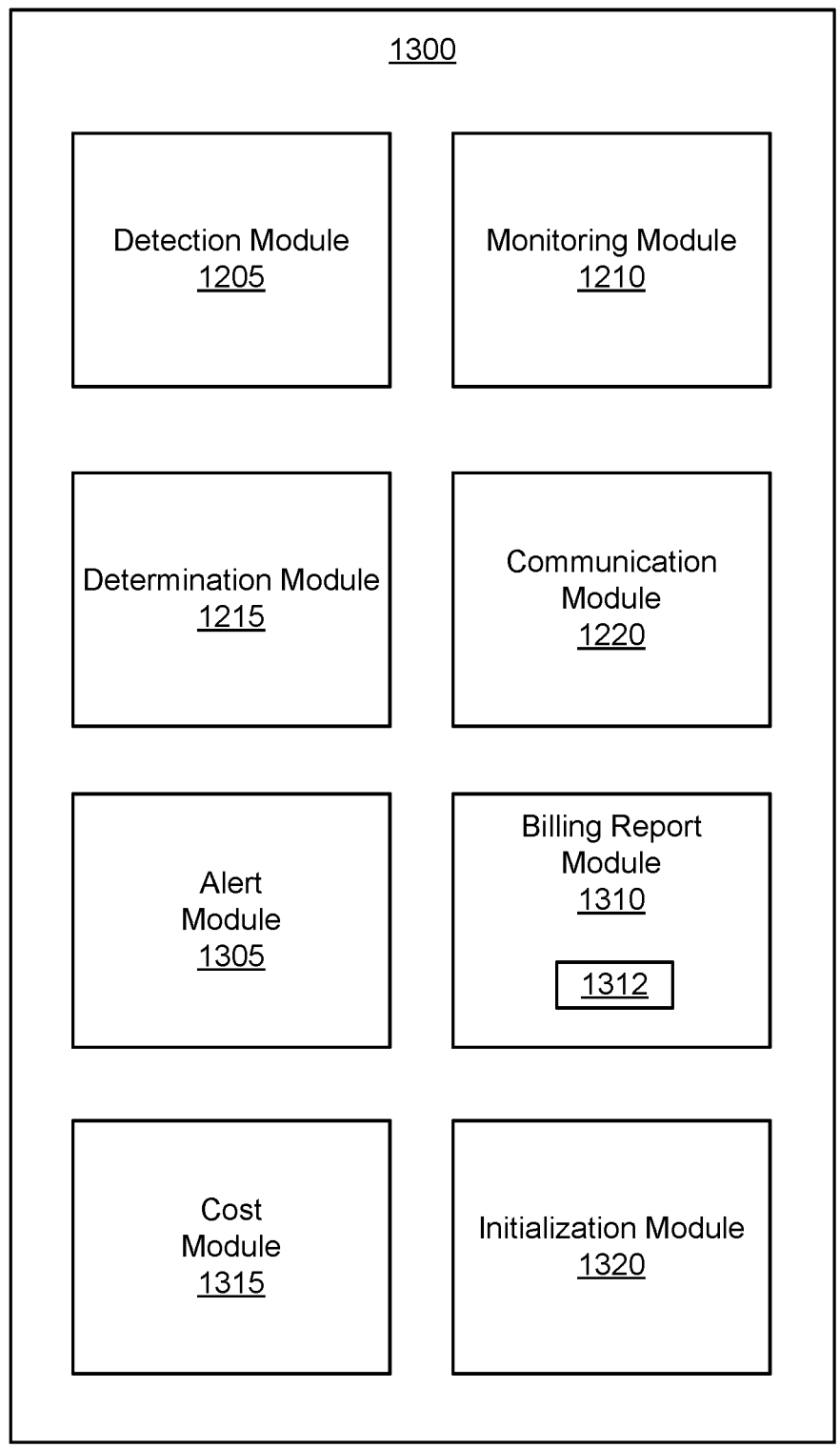
FIG. 13 is a detailed schematic block diagram illustrating another embodiment of an apparatus for advanced function usage-based billing.

FIG. 13 illustrates another embodiment of an apparatus 1300 for advanced function usage-based billing. The apparatus 1300 may be another embodiment or portion of the advanced function monitor 305 depicted in FIG. 3. The description of the apparatus 1300 refers to elements of FIGS. 1-3 and 12, like numbers referring to like elements. The apparatus 1300 includes the detection module 1205, the monitoring module 1210, the determination module 1215, and the communication module 1220, wherein these modules include substantially the same features as described in relation to FIG. 12. In addition, the apparatus 1300 further includes an alert module 1305, a billing report module 1310, a cost module 1315, and an initialization module 1320.

The alert module 1305 generates one or more alerts based on one or more of the monitored detected use and a user attempting to use an advanced function. In one embodiment, the alert module 1305 generates an alert in response to a user attempting to use an unselected (unlicensed) advanced function. For example, the user may attempt to assign a logical volume to the advanced function FlashCopy when it is not part of the user's license agreement. In one embodiment, the alert module 1305 allows the user to continue past the alert and use the unselected advanced function. As described above, the user may incur an extra licensing fee for using an unselected advanced function.

The billing report module 1310 generates a usage-based billing report using recorded billable use information for the advanced functions of the storage controller 230. In one embodiment, the billing report module 1220 generates the usage-based billing report using recorded billable use information for advanced functions used over a predetermined time period. The billing report module 1220 may generate a usage-based billing report for each advanced function and/or a common usage-based billing report for a plurality of advanced functions. The billing report module 1220 may use a reporting routine 1312 in generating the usage-based billing report similar to the planning report module 820 as described above. The reporting routine 1312 may include report parameters directed at licensable features of the advanced functions.

The usage-based billing report may include text and graphics (such as a usage graph) and may be embodied in various data formats such as a text file, Hypertext Transfer Markup Language ("HTML"), Extended Markup Language ("XML") and the like.

The cost module 1315 associates a cost with the billable use information. In certain embodiments, the cost module 1315 interfaces with the determination module 1215 to calculate cost information based on the billable use information. For example, if a licensing cost is based on an amount of storage controller storage an advanced function uses, the cost module 1315 may determine a total cost for the billing report using the amount of storage controller storage and the cost per capacity unit. As a result, the communication module 1220 may communicate cost figures along with use information.

The initialization module 1320 initializes the reporting routine 1312 for the billing report module with accompanying report parameters. Initializing the reporting routine 1312 may include configuring, creating, and/or initiating the reporting routine 1312. In one embodiment, the initialization module 1320 is similar to or embodied as the initialization module 410 described in relation to FIG. 4 and/or the initialization module 920 described in relation to FIG. 9.

Figure 14:
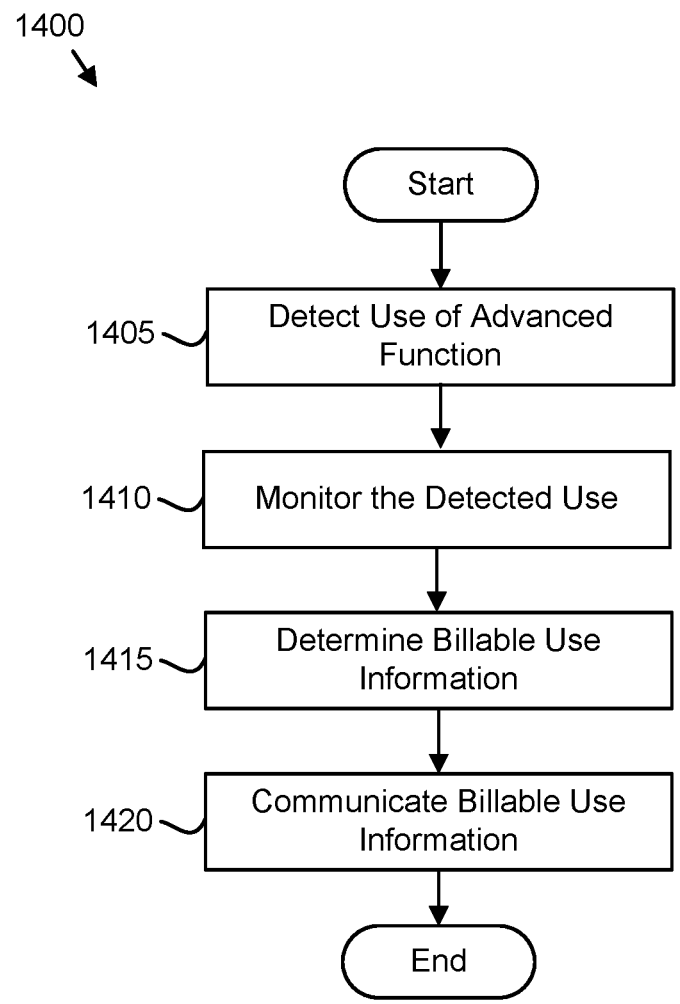
FIG. 14 is a schematic flow chart diagram illustrating one embodiment of a method for advanced function usage-based billing.

FIG. 14 illustrates one embodiment of a method 1400 for advanced function usage-based billing. The method 1400 substantially includes the steps to carry out the functions presented above with respect to the operation of the described apparatus and system of FIGS. 1-3 and 8. The description of the method 1400 refers to elements of FIGS. 1-3 and 12, like numbers referring to like elements.

The method 1400 starts and the detection module 1205 detects 1405 use of one or more advanced functions on a storage controller 230. The monitoring module 1210 monitors 1410 the detected use of each advanced function on the storage controller 230. The determination module 1215 then determines 1415 billable use information of the detected use for each advanced function. Next, the communication module 1220 communicates 1420 the billable use information for the one or more advanced functions to a billing entity. Then, the method 1200 ends.

Figure 15:
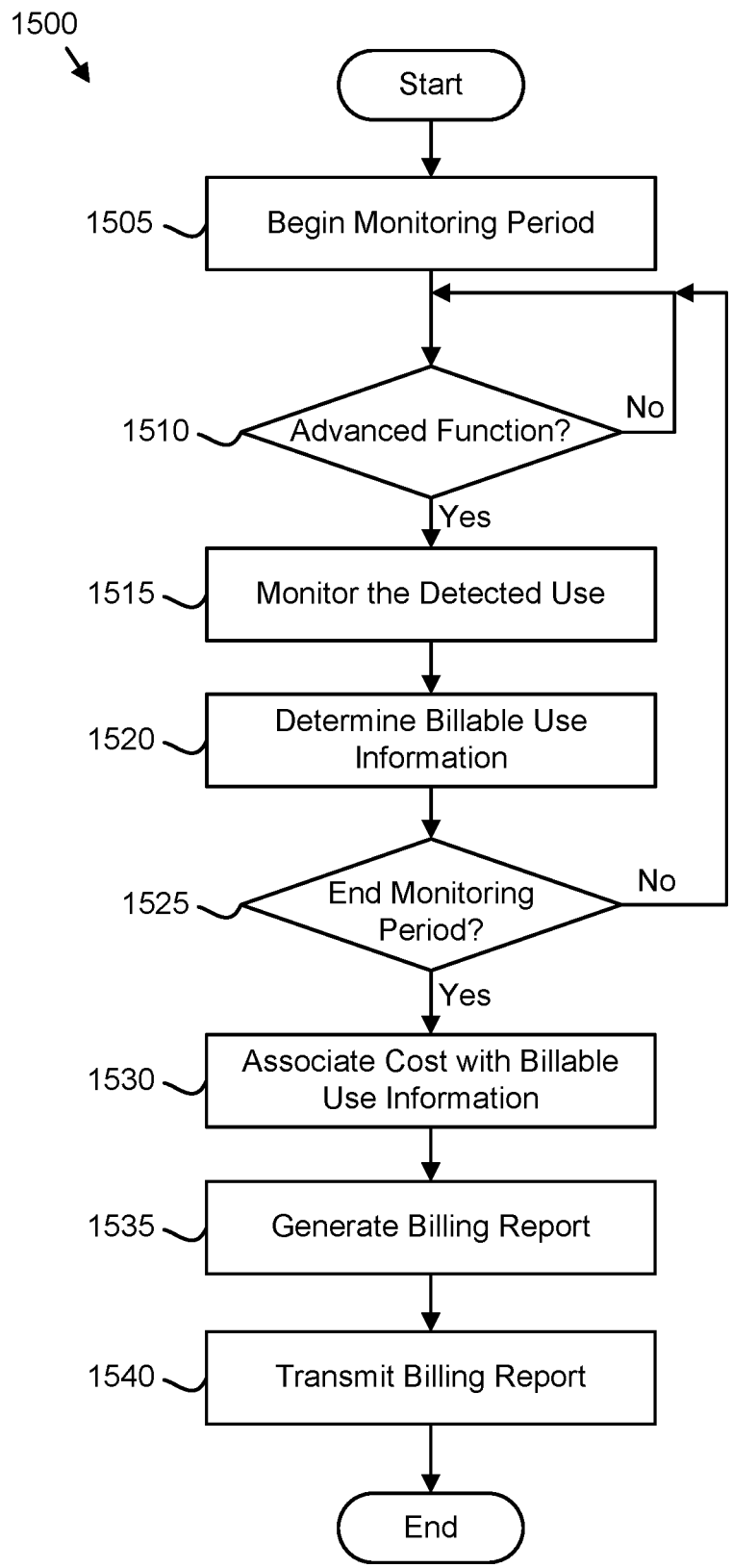
FIG. 15 is a detailed schematic flow chart diagram illustrating another embodiment of a method for advanced function usage-based billing.

FIG. 15 illustrates another embodiment of a method for advanced function usage-based billing. The method 1500 substantially includes the steps to carry out the functions presented above with respect to the operation of the described apparatus and system of FIGS. 1-3 and 12-13. The description of the method 1500 refers to elements of FIGS. 1-3 and 12-13, like numbers referring to like elements.

The method 1500 starts and the detection module 1205 begins 1505 a monitoring period. The detection module 1505 detects 1510 use of one or more advanced functions on a storage controller 230. Next, the monitoring module 1210 monitors 1515 the detected use of each advanced function on the storage controller 230. The determination module 1215 then determines 1520 billable use information of the detected use for each advanced function. The detection module 1205 determines 1525 whether the monitoring period has ended. If the monitoring period has not ended 1525, the detection module 1205 continues to detect 1510 for advanced function use and the detection module 1205 may detect 1510 for advanced function use throughout the monitoring period.

When the detection module 1205 determines 1525 that the monitoring period has ended, the cost module 1315 associates 1530 a cost with the billable use information and the billing report module 1220 generates 1535 a usage-based billing report using recorded billable use information for the advanced functions detected and monitored during the monitoring period. The communication module 1220 communicates 1540 the billing report to a billing entity and/or a user and the method 1500 ends.

FIG. 16 is a schematic block diagram illustrating one embodiment of microcode data 250. The microcode data 250 may be organized as a data structure in the memory 110. In the depicted embodiment, the microcode data 250 includes a plurality of entries 251. Each entry 251 may include a memory address 255 and a microcode identifier 260.

The memory address 255 may include an initial address for microcode of a function such as an advanced function. In addition, the memory address 255 may include address ranges used by the storage controller 230 for all microcode of the function.

The microcode identifier 260 may identify the microcode for the function. The microcode identifier 260 may identify a microcode version of the microcode. In addition, the microcode identifier 260 may identify an advanced function. In one embodiment, the entries 251 only include memory addresses 255 and microcode identifiers 260 for advanced functions.

FIG. 17 is a schematic block diagram illustrating one embodiment of logical volume data 270. The logical volume data 270 maybe organized as a data structure in the memory 110. In the depicted embodiment, the logical volume data 270 includes a plurality of entries 253. Each entry 253 may include a logical volume identifier 275, a customer identifier 280, and logical volume addresses 285.

The logical volume identifier 275 may identify a logical volume. The customer identifier 280 may identify a customer associated with the logical volume. The logical volume addresses 285 may identify a range of addresses associated with a logical volume.

FIG. 18 is a schematic block diagram illustrating one embodiment of association data 290. The association data 290 maybe organized as a data structure in the memory 110. In the depicted embodiment, the association data 290 includes a plurality of entries 254. Each entry 254 may include the logical volume identifier 275 and the microcode identifier 260.

In one embodiment, a host 225 detects the storage controller 230 associating a microcode version for advanced function with a logical volume. The host 225 may record the logical volume identifier 275 of the logical volume and the microcode identifier 260 of the microcode version and the association data 290 in an entry 254.

Figure 19:
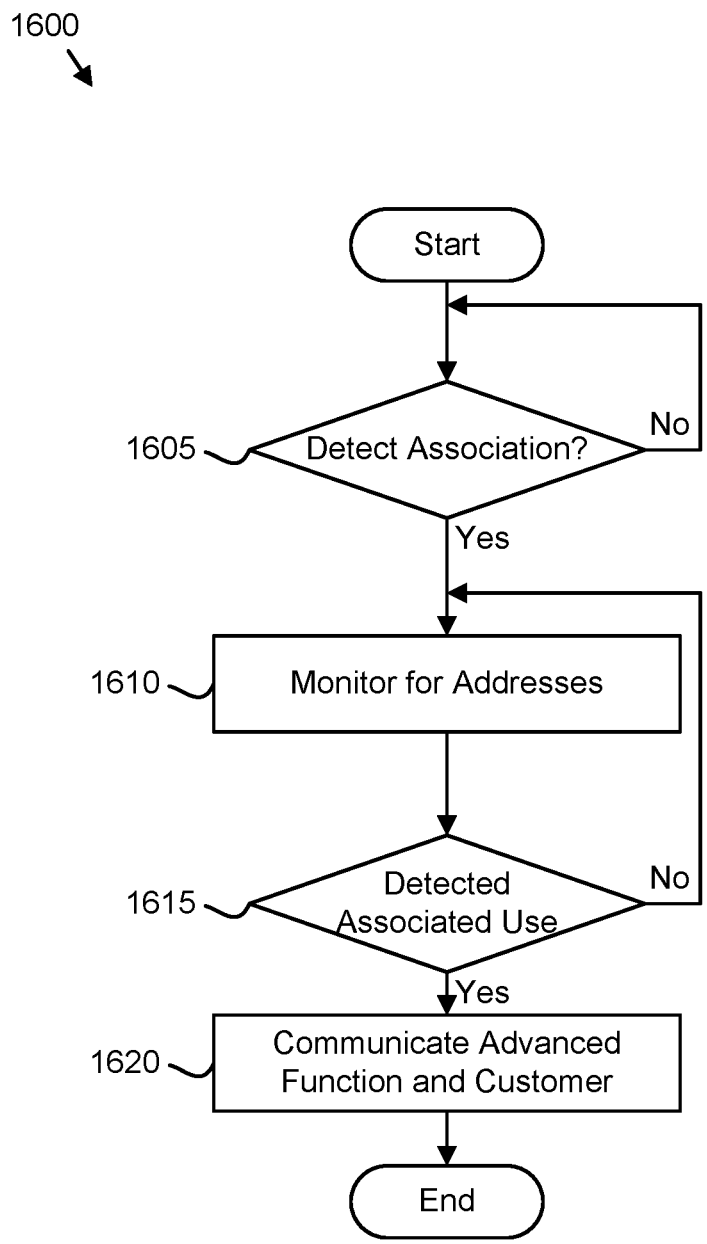
FIG. 19 is a schematic flowchart diagram illustrating one embodiment of an advanced function monitoring method.

FIG. 19 is a schematic flowchart diagram illustrating one embodiment of an advanced function monitoring method 1600. The method 1600 may detect an associated use of the memory address 255 of a microcode version and a logical volume address 285 of a logical volume and communicate an advanced function and the customer to a billing entity. The method 1600 may be performed by a processor 105. In one embodiment, the method 1600 is performed by a host 225.

The method 1600 starts, and in one embodiment, the processor 105 detects 1605 the storage controller 230 associating a microcode version for a given advanced function of one or more advanced functions with a logical volume. The microcode version may be detected by detecting the memory address 255 being used by the storage controller 230 to retrieve the microcode version. The microcode version may be identified using the microcode identifier 260. The logical volume may be detected by detecting the logical volume address 285 and by identifying the logical volume from the logical volume identifier 275.

The processor 105 may detect 1605 the association of the microcode version and the logical volume by detecting 1605 the memory address 255 and the logical volume address 285 being accessed by the storage controller 230 within an association address interval. The association address interval may be a specified number of memory accesses by the storage controller 230.

In an alternative embodiment, the processor 105 detects 1605 the association of the microcode version and the logical volume by detecting 1605 the memory address 255, the logical volume address 285, and a command address for an association command all being accessed by the storage controller 230 within the association address interval. For example, the association command may be a Flashcopy, SE Flashcopy, Metro Mirror, Global Mirror, Metro Global Mirror, Thin Provisioned Volumes, PAV, Hyper Parallel Access Volumes, and/or RMZ command and may be detected from an associated command address.

If the association of the microcode version of the logical volume is not detected 1605, the processor 105 continues to detect 1605 the association. In response to detecting 1605 the storage controller 230 associating the microcode version with the logical volume, the processor 105 monitors 1610 for use of the memory address 255 of the microcode version and the logical volume address 285 of the logical volume. In one embodiment, the processor 105 records the logical volume identifier 275 of the logical volume and the microcode identifier 260 of the microcode version to an entry 254 of the association data 290. In addition, the processor 105 may establish an agent that listens for the storage controller 230 accessing the memory address 255 and the logical volume address 285.

The processor 105 may detect 1615 an associated use of the memory address 255 of the microcode version and the logical volume address 285 of the logical volume. The associated use may be calculated as a function of a frequency of use such as an associated use percentage for the memory address 255 and the logical volume address 285. In one embodiment, the processor 105 records numbers of the accesses of the memory addresses 255 and the logical volume addresses 285 by the storage controller 230. The processor 105 may further calculate the associated use percentage AUP using Equation 1, where SM is the sum of the accesses of the memory addresses 255 over a use interval, SL is the sum of the accesses of the logical volume addresses 285 over the use interval, and TA is the total accesses by the storage controller 230 over the use interval.

$$AUP=(SM+SL)/TA \qquad \text{Equation 1}$$

In one embodiment, if the associated use percentage exceeds a use threshold, the processor detects 1615 the associated use of the memory address 255 of the microcode version and the logical address 285 of the logical volume.

If the processor 105 does not detect 1615 the associated use, the processor 105 continues to monitor 1610 for use of the memory address 255 and the logical volume address 285. If the processor 105 detects 615 the associated use, the processor 105 communicates 1620 the advanced function associated with the memory address 255 and the customer associated with the logical volume address 285 to a billing entity and the method 1600 ends. The advanced function may be retrieved from the microcode identifier 260 associated with the memory address 255. The customer may be identified from the customer identifier 280 associated with the logical volume address 285.

The embodiments detect the storage controller 230 associating a microcode version for a given advanced function of one or more advanced functions with the logical volume and monitor you for use of a memory address 255 of the microcode version and a logical volume address 285 of the logical volume. The embodiments further detect and associated use of the memory address 255 of the microcode version and the logical volume address 285 the logical volume and communicate a given advanced function and a given customer to the billing entity. As a result, the embodiments are able to detect and report the use of the advanced functions by a customer even when the storage controller 230 is incapable of collecting billing information.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a host in communication with a storage controller through a storage area network, the host comprising a processor and a non-transitory computer readable storage medium storing program code executable by the processor to:
    detect the storage controller associating a microcode version for a given advanced function of one or more advanced functions with a logical volume using a microcode data structure comprising a memory address comprising an initial address for the microcode version and a corresponding microcode identifier and a logical volume data structure comprising a logical volume identifier for the logical volume, a customer identifier for a customer associated with the logical volume, and a logical volume address, wherein the microcode version is detected by detecting associating the memory address with the logical volume address, the microcode version is identified from the associated memory address, and the customer identifier is identified from the logical volume address;

in response to detecting the storage controller associating the microcode version for the given advanced function with the logical volume, monitor for use of the memory address of the microcode version and the logical volume address of the logical volume;

detect an associated use of the memory address of the microcode version and the logical volume address of the logical volume; and in response to detecting the associated use, communicate the given advanced function and the given customer.

2. The apparatus of claim 1, where the processor further:
identifies each advanced function as a selected advanced function if the advanced function is licensed and as an unselected advanced function if the advanced function is not licensed; and
generates an alert in response to an attempt to use an unselected advanced function.

3. The apparatus of claim 2, wherein each advanced function is one or more of an available advanced function and the selected advanced function, the available advanced function comprising an advanced function that the storage controller is capable of executing, the selected advanced function comprising an advanced function selected by a user, wherein the processor monitors use of the available advanced functions, the selected advanced functions, and the unselected advanced functions, and wherein each advanced function is executable by the storage controller for each logical volume regardless of whether the advanced function is licensed.

4. The apparatus of claim 3, wherein the one or more advanced functions comprise one or more of Hyper Parallel Access Volumes and Remote Mirror for System Z.

5. The apparatus of claim 1, wherein the processor detects the storage controller associating the microcode version for the given advanced function of one or more advanced functions with the logical volume by detecting the memory address of the microcode version and the logical volume address of the logical volume being accessed by the storage controller within an association address interval.

6. The apparatus of claim 1, wherein the processor detects the associated use of the memory address of the microcode version and the logical volume address of the logical volume as a function of an associated use percentage for the memory address and the logical volume address.

7. The apparatus of claim 1, wherein, the storage controller manages data storage on one or more storage devices, each of the one or more advanced functions comprising a license-based storage operation of the storage controller, and the one or more advanced functions are separate from a standard function set of the storage controller.

8. A method comprising:
detecting, by use of a processor, a storage controller associating a microcode version for a given advanced function of one or more advanced functions with a logical volume using a microcode data structure comprising a memory address comprising an initial address for the microcode version and a corresponding microcode identifier and a logical volume data structure comprising a logical volume identifier for the logical volume, a customer identifier for a customer associated with the logical volume, and a logical volume address, wherein the microcode version is detected by detecting associating the memory address with the logical volume address, the microcode version is identified from the associated memory address, the customer identifier is identified from the logical volume address, and the processor is embodied in a host in communication with the storage controller through a storage area network;

in response to detecting the storage controller associating the microcode version for the given advanced function with the logical volume, monitoring for use of a memory address of the microcode version and a logical volume address of the logical volume;

detecting an associated use of the memory address of the microcode version and the logical volume address of the logical volume; and in response to detecting the associated use, communicating the given advanced function and the given customer.

9. The method of claim 8, the method further comprising:
identifying each advanced function as a selected advanced function if the advanced function is licensed and as an unselected advanced function if the advanced function is not licensed; and
generating an alert in response to an attempt to use an unselected advanced function.

10. The method of claim 9, wherein each advanced function is one or more of an available advanced function and the selected advanced function, the available advanced function comprising an advanced function that the storage controller is capable of executing, the selected advanced function comprising an advanced function selected by a user, wherein the processor monitors use of the available advanced functions, the selected advanced functions, and the unselected advanced functions, and wherein each advanced function is executable by the storage controller for each logical volume regardless of whether the advanced function is licensed.

11. The method of claim 10, wherein the one or more advanced functions comprise one or more of Hyper Parallel Access Volumes and Remote Mirror for System Z.

12. The method of claim 8, wherein the method detects the storage controller associating the microcode version for the given advanced function of one or more advanced functions with the logical volume by detecting the memory address of the microcode version and the logical volume address of the logical volume being accessed by the storage controller within an association address interval.

13. The method of claim 8, wherein the method detects the associated use of the memory address of the microcode version and the logical volume address of the logical volume as a function of an associated use percentage for the memory address and the logical volume address.

14. The method of claim 8, wherein, the storage controller manages data storage on one or more storage devices, each of the one or more advanced functions comprising a license-based storage operation of the storage controller, and the one or more advanced functions are separate from a standard function set of the storage controller.

15. A computer program product comprising a non-transitory computer readable storage medium having program instructions embodied therewith, the program instructions readable/executable by a processor to cause the processor to:
  detect a storage controller associating a microcode version for a given advanced function of one or more advanced functions with a logical volume using a microcode data structure comprising a memory address comprising an initial address for the microcode version and a corresponding microcode identifier and a logical volume data structure comprising a logical volume identifier for the logical volume, a customer identifier for a customer associated with the logical volume, and a logical volume address, wherein the microcode version is detected by detecting associating the memory address with the logical volume address, the microcode version is identified from the associated memory address, the customer identifier is identified from the logical volume address, and the processor is embodied in a host in communication with the storage controller through a storage area network;
  in response to detecting the storage controller associating the microcode version for the given advanced function with the logical volume, monitor for use of a memory address of the microcode version and a logical volume address of the logical volume;
  detect an associated use of the memory address of the microcode version and the logical volume address of the logical volume; and
  in response to detecting the associated use, communicate the given advanced function and the given customer.

16. The computer program product of claim 15, the program instructions further causing the processor to:
  identify each advanced function as a selected advanced function if the advanced function is licensed and as an unselected advanced function if the advanced function is not licensed; and
  generate an alert in response to an attempt to use an unselected advanced function.

17. The computer program product of claim 16, wherein each advanced function is one or more of an available advanced function and the selected advanced function, the available advanced function comprising an advanced function that the storage controller is capable of executing, the selected advanced function comprising an advanced function selected by a user, wherein the processor monitors use of the available advanced functions, the selected advanced functions, and the unselected advanced functions, and wherein each advanced function is executable by the storage controller for each logical volume regardless of whether the advanced function is licensed.

18. The computer program product of claim 17, wherein the one or more advanced functions comprise one or more of Hyper Parallel Access Volumes and Remote Mirror for System Z.

19. The computer program product of claim 15, wherein the processor detects the storage controller associating the microcode version for the given advanced function of one or more advanced functions with the logical volume by detecting the memory address of the microcode version and the logical volume address of the logical volume being accessed by the storage controller within an association address interval.

20. The computer program product of claim 15, wherein the method detects the associated use of the memory address of the microcode version and the logical volume address of the logical volume as a function of an associated use percentage for the memory address and the logical volume address.

* * * * *